US012247366B2

(12) United States Patent
Park

(10) Patent No.: US 12,247,366 B2
(45) Date of Patent: Mar. 11, 2025

(54) UTILITY SCALE HYDRO PUMP SYSTEM AND METHOD

(71) Applicant: Brent K Park, Falls Church, VA (US)

(72) Inventor: Brent K Park, Falls Church, VA (US)

( * ) Notice: Subject to any disclaimer, the term of this patent is extended or adjusted under 35 U.S.C. 154(b) by 165 days.

(21) Appl. No.: 17/985,937

(22) Filed: Nov. 14, 2022

(65) Prior Publication Data

US 2024/0159006 A1 May 16, 2024

(51) Int. Cl.

*F03B 15/00* (2006.01)
*E02B 9/00* (2006.01)
*F03B 13/06* (2006.01)

(52) U.S. Cl.

CPC ................ *E02B 9/00* (2013.01); *F03B 13/06* (2013.01); *F03B 15/005* (2013.01); *F05B 2210/11* (2013.01); *F05B 2260/422* (2020.08)

(58) Field of Classification Search

CPC .......... E02B 9/00; F03B 13/06; F03B 15/005; F03B 17/005; F05B 2210/11; F05B 2260/422

See application file for complete search history.

(56) References Cited

U.S. PATENT DOCUMENTS 4,476,396 A * 10/1984 Calvert, Jr. ............. F03B 13/08 290/43
8,456,027 B1 * 6/2013 Seehorn ............... H02K 7/1823 290/1 R
8,516,812 B2 * 8/2013 Manakkattupadeettathil .............. F03B 17/005 290/1 R
11,415,097 B1 * 8/2022 Park ....................... F03B 17/025
2002/0148222 A1 * 10/2002 Zaslavsky ............. F03G 7/0254 60/398
2010/0244450 A1 * 9/2010 Tabe ..................... F03B 13/262 290/55
2013/0318960 A1 * 12/2013 Chiu ..................... F03B 17/025 60/496
2014/0130497 A1 * 5/2014 Anteau ................. F03B 17/005 60/495
2014/0312623 A1 * 10/2014 Anteau ................... F03B 13/08 290/52
2014/0353221 A1 * 12/2014 Biley ..................... A01D 44/00 210/85
2015/0128597 A1 * 5/2015 Schlak ................... B64D 31/00 60/719
2017/0268192 A1 * 9/2017 Biley ..................... A01G 33/00
2018/0149131 A1 * 5/2018 Alkhars .................. F03B 15/16
(Continued)

*Primary Examiner* — Edwin J Toledo-Duran

(57) ABSTRACT

The Utility Scale Hydro Pump (USHP) is a hydromechanical system that uses a water-moving vehicle in a uniquely configured water tower to generate hydropotential energy and electricity. The vehicle operates in a lower chamber of the water tower. An upper chamber in the water tower has two distinct compartments: a body chamber just above the lower chamber to hold water for the vehicle to pump, and a tall and slender head chamber for the head. Lifting the vehicle from the bottom of the lower chamber pushes up water in the upper chamber into an upper reservoir. As the vehicle is lifted, a void is generated in the lower chamber. The void in the lower chamber is filled with water from a lower reservoir. Releasing water from the upper reservoir operates a turbine generator to generate electricity. Hydrodischarge from a turbine generator is collected in the lower reservoir and recycled.

4 Claims, 12 Drawing Sheets

(56) References Cited

U.S. PATENT DOCUMENTS

| | | | | |
|---|---|---|---|---|
| 2019/0203689 | A1* | 7/2019 | Sheldon-Coulson | H02K 7/183 |
| 2019/0353139 | A1* | 11/2019 | Sheldon-Coulson | F03B 13/24 |
| 2020/0056578 | A1* | 2/2020 | Sheldon-Coulson | B63B 1/048 |
| 2020/0056584 | A1* | 2/2020 | Sia | F03B 3/04 |
| 2020/0095985 | A1* | 3/2020 | Anteau | F04F 5/02 |
| 2021/0148327 | A1* | 5/2021 | Anteau | F04F 5/10 |
| 2021/0332786 | A1* | 10/2021 | Swift | F03B 3/00 |
| 2023/0078347 | A1* | 3/2023 | Sheldon-Coulson | C25B 15/023<br>205/637 |

* cited by examiner

UTILITY SCALE HYDRO PUMP SYSTEM AND METHOD

BACKGROUND OF THE INVENTION

Developing and deploying additional hydropower is essential to achieving comprehensive, clean, and renewable energy solutions. Hydroelectric power plants use water flowing through turbine generators to generate electricity. Water is renewed and supplied by snow or rainfall. Less discussed but crucially important is pumped-storage hydropower (PSH), which uses excess power from the grid to pump water into an upper reservoir and then release water to generate electricity as needed. Although current PSH uses more energy than it generates, it is effective in storing hydropotential energy. A typical PSH upper reservoir is large enough to hold water for 8 to 10 hours of power generation.

Expanding hydropower capacity requires substantial capital costs. The siting requirements for hydropower facilities demand adequate rainfall or water availability to replenish water. Environmental impacts may not be ignored for PSH facilities, as some operate with more than 300 m heads. Because they are typically built on hills, it might take up to 4 km to achieve the head.

There are hundreds of solar, wind, and battery storage development efforts waiting to connect to the existing power grid. Adding standalone hydropower systems will face the same difficulties with interconnections unless they are more reliable than currently available energy options waiting to be integrated into the existing power grid or they require substantially less capital investment for the new power grid.

The present invention introduces the Utility Scale Hydro Pump (USHP), a hydromechanical system to address some of the above limitations and challenges. USHP is purposefully designed to be practical by making its apparatus modular, scalable, additive, and environmentally friendly to build and operate. With steady and controllable operations, USHP is relatively easy to integrate into the existing power grid or operate as standalone power production (SPP) units. Unlike solar and wind energy infrastructures, USHP requires much less land and could be built at or near the location of electricity consumption. Furthermore, USHP operates on demand and is not affected by weather.

The present invention is an innovative hydromechanical system to efficiently pump water up to a higher elevation by generally following the Vertical Mechanical Separation of Water (VMSW) technique.

FIELD OF THE INVENTION

The present invention provides water to a higher elevation as input fuel for various applications in the energy storage and hydroelectric power industries.

THE PRIOR ART

The prior art systems recognize the benefits of using combinations of buoyancy and gravity to gain potential energy that could be converted to other forms of energy, including electricity.

U.S. Ser. No. 11/415,097B1 describes the VMSW setup to solve the very difficult problem of placing a buoyant object or adding water into a water tower without losing water in the water tower.

The VMSW system regulates the usable volume of water near the top of the water tower to change the water level in the water tower. A positively buoyant driver moves vertically, following the water level in the water tower. As the driver moves up, a void is produced in a lower chamber-equal to the volume of the driver no longer in the lower chamber. Water from a lower reservoir, through a sliding watertight recycle door, flows into the lower chamber, filling the void in the lower chamber. After transferring water to an upper reservoir near the top of the water tower, the water level is once again changed to restore the VMSW system to the initial settings for repeating operations.

The VMSW system capacity is directly proportional to the volume of the driver operating in the water tower. U.S. Ser. No. 11/415,097B1 provides a simple qualitative energy calculation using a driver with a radius of 1.7 m and a 70-m length to achieve a 50-m head to generate electricity comparable to a 1-megawatt (MW) wind turbine generator (WTG). Although the calculation is for illustrative purposes, the driver in this example has a mass of 500 MT. To double the power output, the VMSW system needs a water tower, including the driver, twice as large in dimension and weight.

Other prior art systems have attempted to generate power using various techniques to insert, inject, or circulate buoyant objects. US20140196450A1 describes a method to gain potential energy by inserting buoyant objects through several chambers, leading the buoyant objects to the top of the water tank. WO2014/128729A2 uses a hollow launching chamber in the lower part of the water tank. U.S. Pat. No. 5,944,480A, JPH10141204A, JP2002138944A, and DE102012009226A1 rely on either a vacuum effect to retain liquid in the tube, a watertight seal to slide balls into the tube, or air pressure in the drive system to load. US20190338747A1 features a start/stop system with buoyant modules moving through a bi-level water tank. US20140130497A1 explains a system that relies on fluid flow due to pressure differentials. US20130318960A1 uses a bladder to control the buoyancy mechanism, while U.S. Pat. No. 8,456,027B1 describes a system to rotate a driver shaft by alternately charging buoyancy vehicles with pressurized gas.

US20060042244A1 provides details of a fluid shaft used in a hermetically sealed buoyancy chamber. U.S. Pat. No. 4,718,232A discloses a closed-loop system with multiple valves and a pressure control design. WO2014/035267A1 uses floating devices alternatively to generate power, while U.S. Pat. No. 8,516,812B2 discloses a vertical pipe system to float objects. JP2020190243A disclosure uses a floating object in a water tank.

Technical Problem

The VMSW system is heavy, difficult to build, and difficult to operate. Furthermore, continuously changing the water level in the water tower to raise, hold, and lower an extremely large and heavy driver presents difficult engineering challenges.

Solution to Problem

To be practical and competitive with other renewable energy options, it is necessary to significantly reduce the dimensions and mass of the water tower to mitigate safety concerns as well as minimize costs to build and operate without compromising the system capacity.

BRIEF SUMMARY OF THE INVENTION

Hereinafter, the term "USHP" is used to describe a hydromechanical system and apparatus and includes all the components and physical structures as well as functionalities. Also, the term "water tower" is used specifically for the vertically arranged lower chamber and upper chamber and all components in these two chambers to clearly describe the water volume in the water tower during various stages of the operation.

The top of the lower chamber and the bottom of the upper chamber share a chamber opening. The lower chamber, via a sliding watertight recycle door, is connected to a lower reservoir. The lower reservoir collects, stores, and supplies recycled water to the lower chamber of the water tower when the recycle door opens. The water level in the lower reservoir is kept higher than the top of the lower chamber to continuously supply water to the lower chamber. The top of the upper chamber is connected to an upper reservoir.

Although there are many different variations, USHP prefers to use a water-moving vehicle with compressible walls to push or pump water into the upper reservoir. The vehicle volume generally defines the maximum amount of water pumped into the upper reservoir, and the height of the vehicle determines the height of the lower chamber. When fully lifted or compressed, the bottom of the vehicle is flush with the top of the lower chamber or any height up to this point.

The upper chamber comprises a body chamber and a head chamber. The body chamber, directly above the lower chamber. The head chamber, above the body chamber, has an inner cross section much smaller than that of the body chamber. A smaller cross section of the head chamber compared to that of the body chamber allows USHP to reduce the original VMSW water tower volume and mass by up to 90% or more.

Using a vehicle lifting device (VLD), USHP lifts or compresses the vehicle to produce a void without losing the original volume of water in the lower chamber and without sharing water between the lower chamber and the upper chamber while the vehicle is lifted. As the vehicle is lifted, a void is produced with a volume equal to the vehicle volume that no longer exists in the lower chamber. The void, as produced, gets filled with water from the lower reservoir through the recycle door. Lifting the vehicle results in pumping, through the chamber opening, water in the upper chamber into the upper reservoir.

Released water from the upper reservoir operates a hydro turbine generator, and its hydro discharge or exiting water from the hydro turbine generator replenishes the lower reservoir. The vehicle is returned to the bottom of the lower chamber for repeat operations.

While leaving the rest of the USHP about the same, making the head chamber taller increases the system capacity. USHP is a practical and buildable translation of VMSW.

BRIEF DESCRIPTION OF THE DRAWINGS

The drawings show preferred embodiments and are not intended to limit the scope of the present invention.

* and FIG. 7*d* is the void volume produced in the lower chamber in FIG. 7*c*.

DETAILED DESCRIPTION OF THE INVENTION

USHP can use commonly available sensors and motorized components that require an external power source. Descriptions and functionalities of the commonly used parts are not provided in detail, such as opening or closing a sliding watertight door, etc. Throughout the discussion, each term or terminology represents a unique apparatus component, feature, or function to further clarify descriptions and methods.

Figure 1:
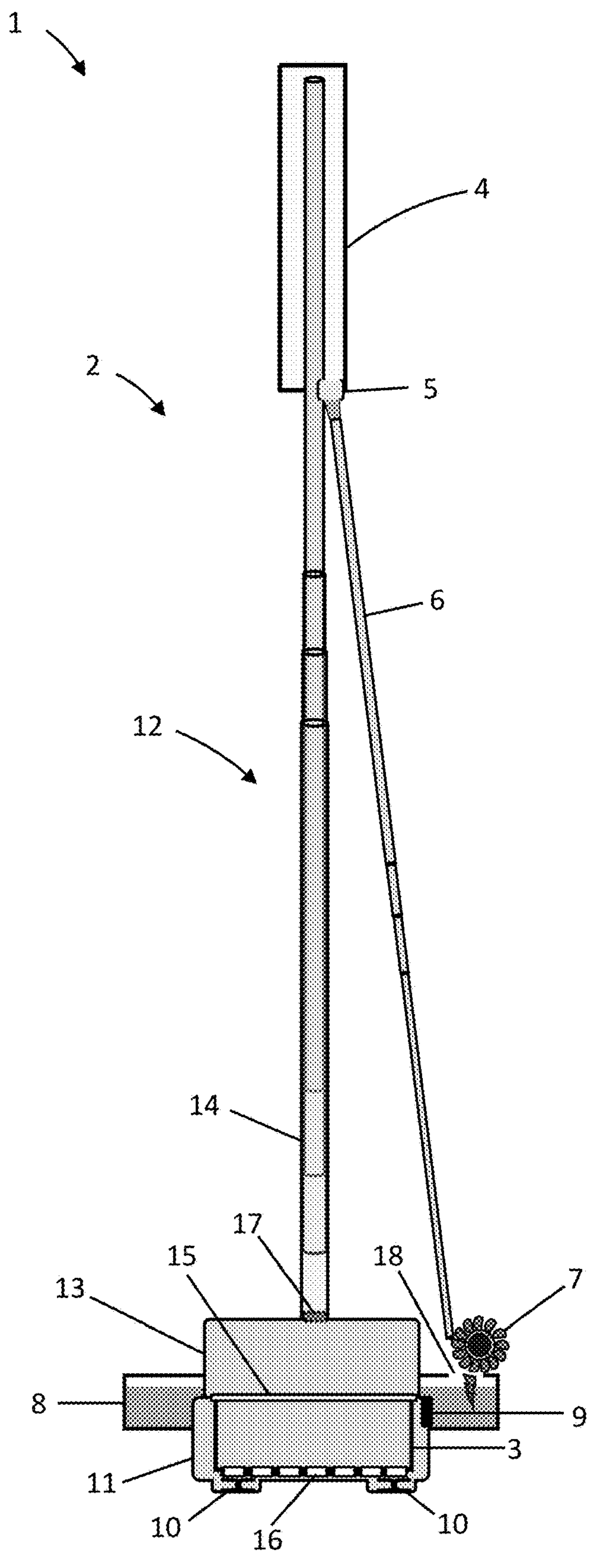
FIG. 1 is a schematic diagram of a side view (SDSV) of USHP.

FIG. 1 shows a perspective SDSV of USHP 1 comprising a water tower 2 with a vehicle 3, an upper reservoir 4, a reservoir release valve 5, a penstock 6, a turbine generator 7, a lower reservoir 8, a recycle door 9, and a VLD 10. The lower reservoir 8 shown wraps around the lower part of the water tower 2.

Figure 2A:
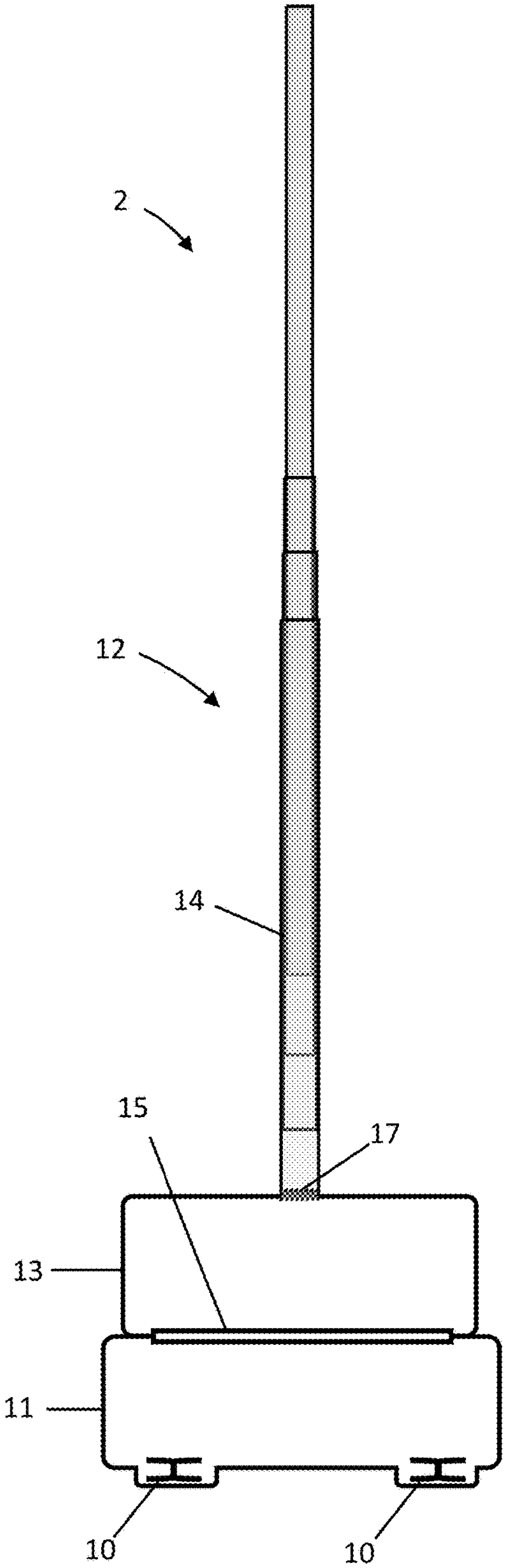
FIG. 2*a* is a SDSV of a water tower structure. A vehicle is not shown to further highlight a chamber opening between a lower chamber and a body chamber.
Figure 2B:
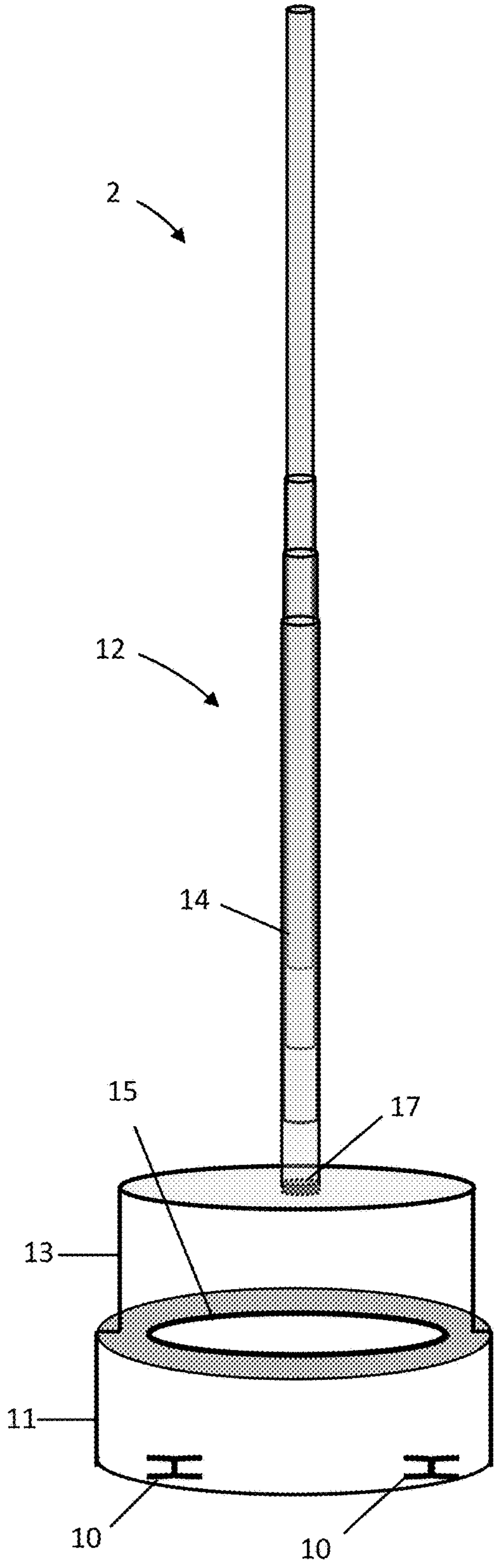
FIG. 2*b* shows FIG. 2*a* in pseudo-3D (SDSV-3D).

FIG. 2*a* shows a SDSV of the water tower 2, comprising a lower chamber 11 and an upper chamber 12. FIG. 2*b* is a SDSV-3D of FIG. 2*a*. The upper chamber 12 further comprises a body chamber 13 and a head chamber 14 that have multiple segments that extend and retract.

The top of the lower chamber 11 and the bottom of the upper chamber 12 share a chamber opening 15.

Figure 3A:
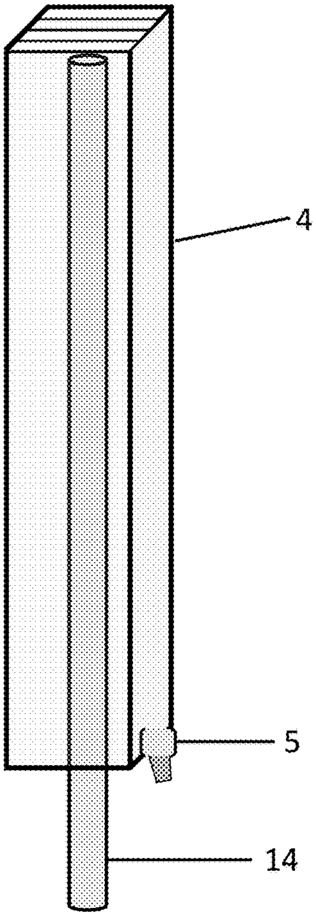
FIG. 3*a* is a SDSV-3D of the upper reservoir from FIG. 1 with the top of the upper reservoir open but protected from debris.
Figure 3B:
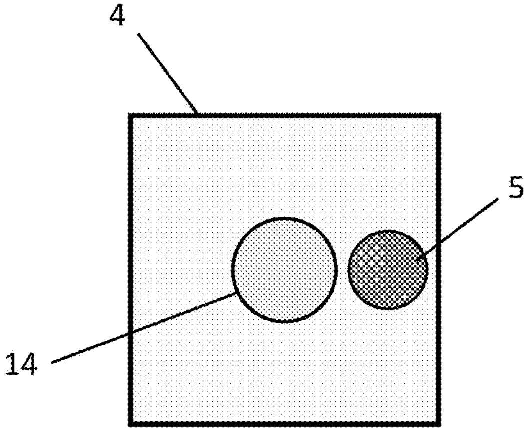
FIG. 3*b* is a schematic diagram of a cross section of the bottom of the upper reservoir shown in FIG. 3*a*.

FIG. 3*a* is a SDSV-3D of the upper reservoir 4 from FIG. 1. The upper reservoir 4 is shown to wrap around the head chamber 14 near the top of the water tower 2. The head is calculated from the water surface level of the upper reservoir 4 and not from the location of the reservoir release valve 5. Having a large enough upper reservoir 4 for steady water release is important for steady power production. It is important to keep the top of the upper reservoir 4 protected from weather elements but open to allow for unimpeded water release down through the reservoir release valve 5. FIG. 3*b* is a schematic diagram of a cross section of the upper reservoir 4 along with a reservoir release valve 5 and the head section 14.

A vehicle 3, denser than water, rests at the bottom of the lower chamber 11 (FIG. 1), an initial default position. It is preferred to have the top of the vehicle 3 flush with the bottom of the upper chamber 12 to minimize the body chamber 13 volume. The vertical movement of vehicle 3 is generally limited to being less than its height.

Figure 4A:
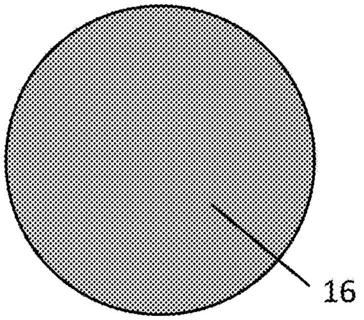
FIGS. 4*a*, 4*b* show a cylindrical vehicle base in the form of a grill closed and open, respectively. Open and closed vehicle bases combine and separate water between the lower chamber and the upper chamber, respectively. A cylinder-shaped vehicle is used throughout for illustration purposes.
Figure 4B:
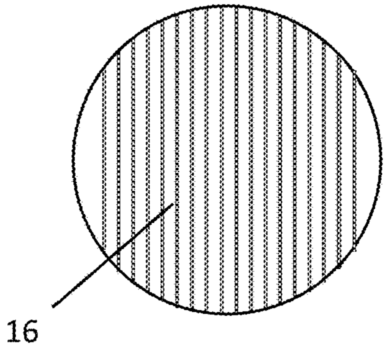

Although the rest of the discussion uses a cylinder-shaped vehicle 3, it can take many different shapes and forms. The vehicle 3 further comprises a vehicle base 16 that opens and closes. FIGS. 4*a* and 4*b* show a vehicle base 16 with a grill closed and open, respectively. Water in the lower chamber 11 and the upper chamber 12 needs to be separated when vehicle 3 is being lifted or compressed to pump water into the upper reservoir 4. Water leakage or loss from the water tower 2 while the vehicle 3 is being lifted will reduce the system capacity. To prevent unplanned water release from the head chamber 14, a one-way waterflow valve 17 is placed at the bottom of the head chamber 14 (FIG. 1).

Figure 5A:
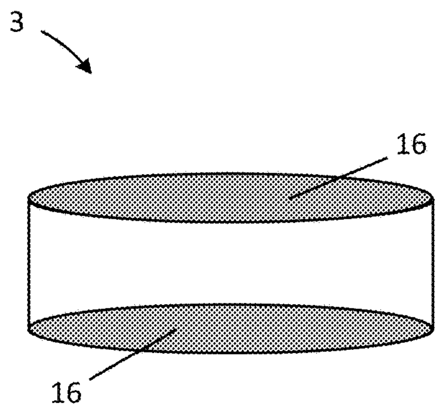
FIGS. 5*a*, 5*b* show a SDSV-3D of a vehicle with both top and bottom vehicle bases closed and open, respectively.

Vehicle 3 can also have a top vehicle base 16 and a bottom vehicle base 16 (FIG. 5*a*).

Figure 5B:
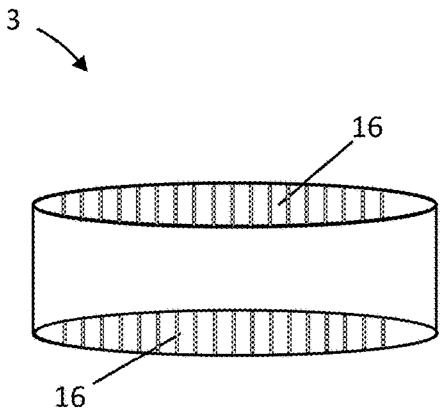

Stretchable watertight bellows, secured between the top of the vehicle 3 and the chamber opening 15, will ensure no water loss or leakage from the upper chamber 12 when a vehicle base 16 is closed. Completely closing at least one vehicle base 16 disconnects, whereas opening both the top and bottom vehicle bases 16 (FIG. 5*b*) connects the lower chamber 11 and the upper chamber 12. When the lower chamber 11 and the upper chamber 12 are connected, there is fluid communication between the two chambers.

Figure 5C:
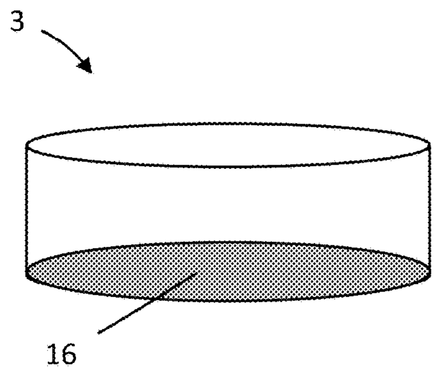
FIGS. 5*c*, 5*d* show a SDSV-3D of a vehicle with only the bottom vehicle base closed and open, respectively.
Figure 5D:
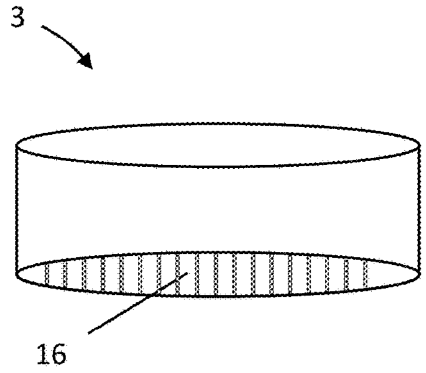
Figure 5E:
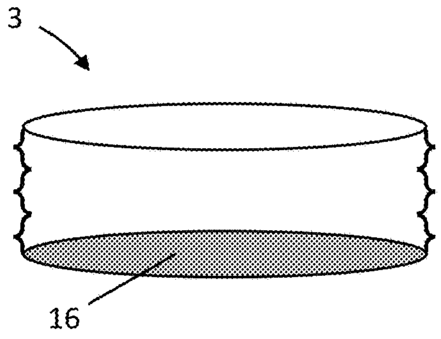
FIGS. 5*e*, 5*f* show a SDSV-3D of a vehicle with compressible walls with only the bottom vehicle base closed and open, respectively.
Figure 5F:
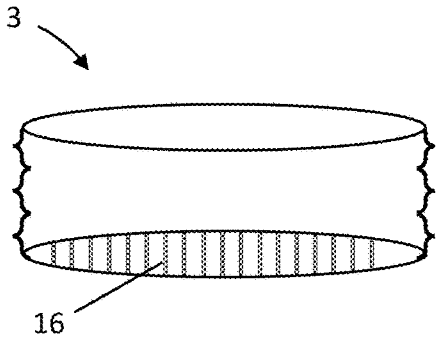

Vehicle 3 is operated with one vehicle base 16 (FIGS. 5*c*, 5*d*). Vehicle 3 further comprises straight or compressible walls, as shown in FIGS. 5*e* and 5*f*.

Figure 6A:
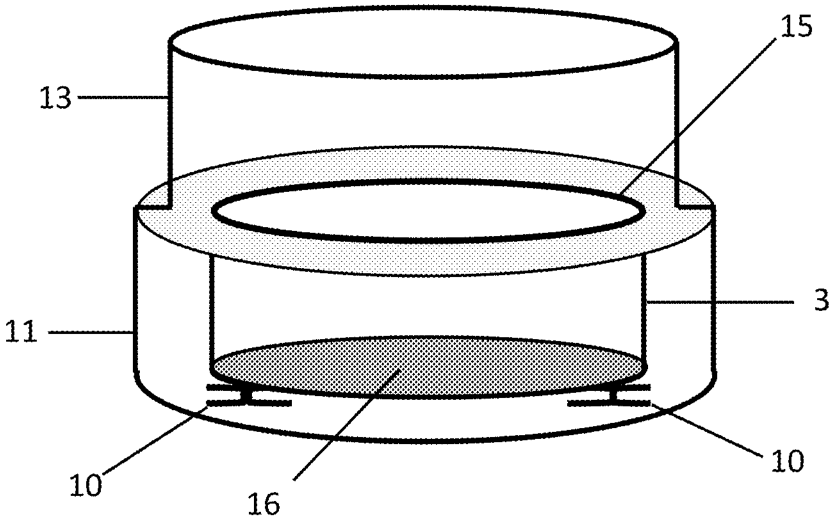
FIG. 6*a* shows a SDSV-3D of the vehicle, as shown in FIG. 5*c*, in the lower chamber; only a portion of the upper chamber is shown.
Figure 6B:
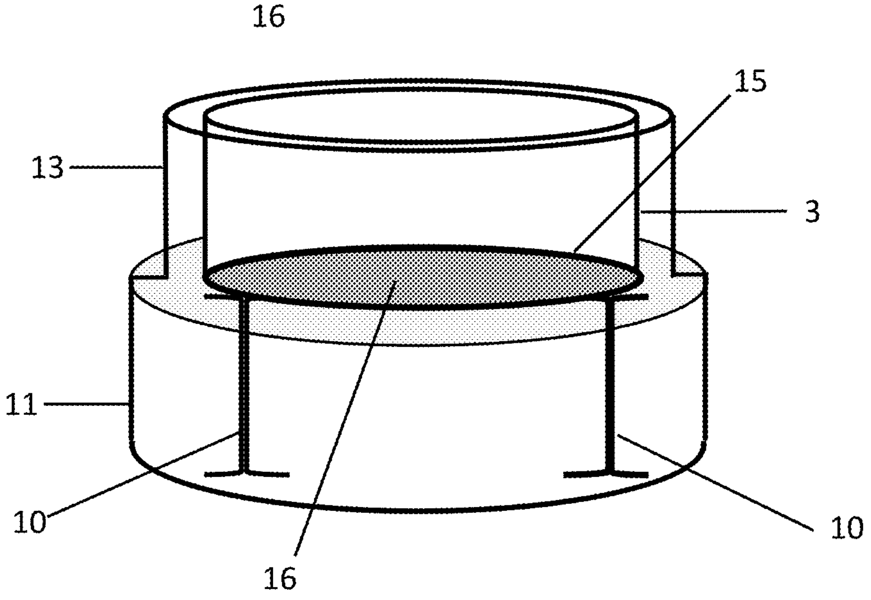
FIG. 6*b* shows a SDSV-3D of the vehicle, as shown in FIG. 5*c*, lifted to the upper chamber with a VLD. The vehicle volume no longer in the lower chamber is the void volume produced.

FIG. 6*a* shows the vehicle 3 from FIG. 5*c* in the lower chamber 11 with the vehicle base 16 closed. FIG. 6*b* shows the vehicle 3 from FIG. 5*c*, lifted to the body chamber 13. The volume of vehicle 3, no longer in the lower chamber 11, is the void volume that gets filled with water from the lower reservoir 8.

Figure 7A:
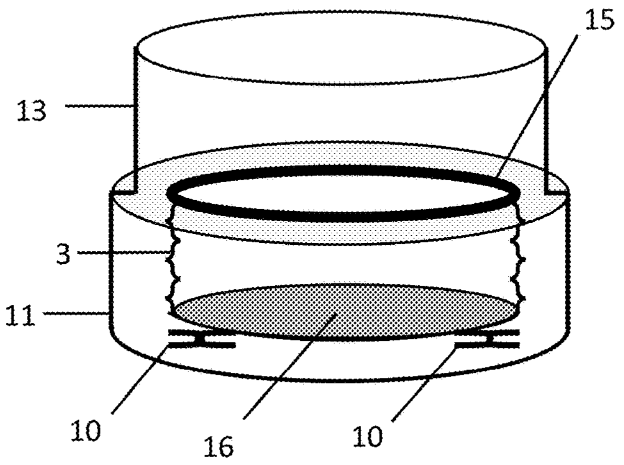
FIG. 7*a* shows a SDSV-3D of a vehicle with compressible walls in its original condition with the vehicle walls stretched and the bottom vehicle base closed.
Figure 7B:
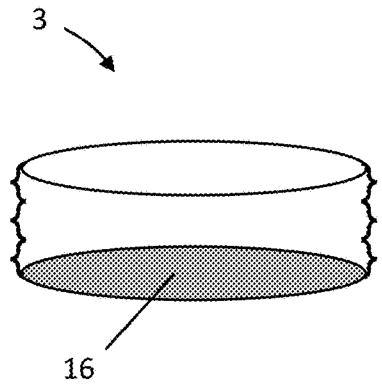
FIG. 7*b* shows the vehicle isolated from FIG. 7*a*.
Figure 7C:
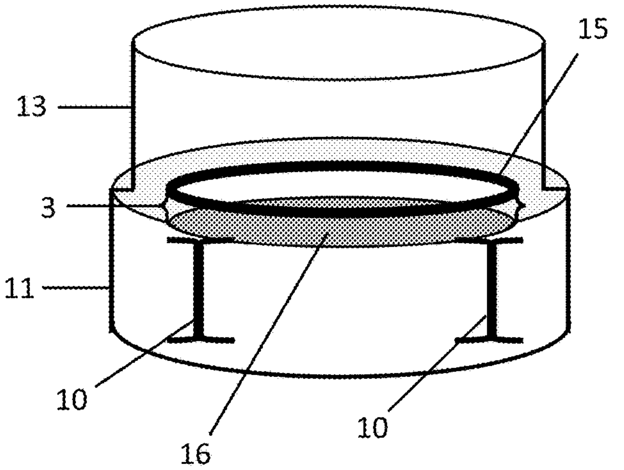
FIG. 7*c* shows a SDSV-3D of the vehicle in FIG. 7*a* lifted with the VLD.
Figure 7D:
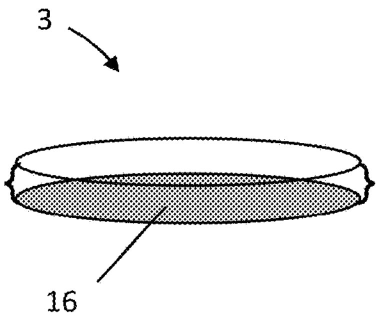
FIG. 7*d* shows the vehicle from FIG. 7*c* isolated. The volume difference in the vehicles between FIG. 7*b

A vehicle 3 with compressible walls shown in FIG. 7*a*, 7*c* in the lower chamber 11. FIGS. 7*b* and 7*d* show isolated vehicle 3 from FIGS. 7*a* and 7*c*, respectively. The top edge around vehicle 3 is secured watertight to the chamber opening 15, and the stretchable, watertight bellows are no longer required. With the vehicle base 16 closed, water in the lower chamber 11 and the upper chamber 12 are separated, and vehicle 3 is ready to be lifted (FIG. 7*a*). As a VLD 10 lifts the vehicle 3, the vehicle 3 walls get compressed and push water in the upper chamber 12 into the upper reservoir 4. For simplicity, the rest of the discussion uses a cylinder-shaped vehicle 3 with compressible walls.

When the vehicle base 16 closes, the water inside vehicle 3 belongs to the upper chamber 12 due to how the water is separated in the water tower 2.

Closing the recycle door 9 and then opening the vehicle base 16 decompress the walls of the vehicle 3, and the vehicle 3 returns to its initial setting.

USHP design allows some components and functions to be combined or performed differently than explained above. For example, a vehicle 3 can be equipped with motorized gears that have incorporated VLD 10 functions.

FIG. 8 through FIG. 12 show USHP 1 in various stages of operation. To focus on the changes in the water tower 2, some components, such as a penstock 6 and a turbine generator 7, are not shown in these figures.

Figure 8:
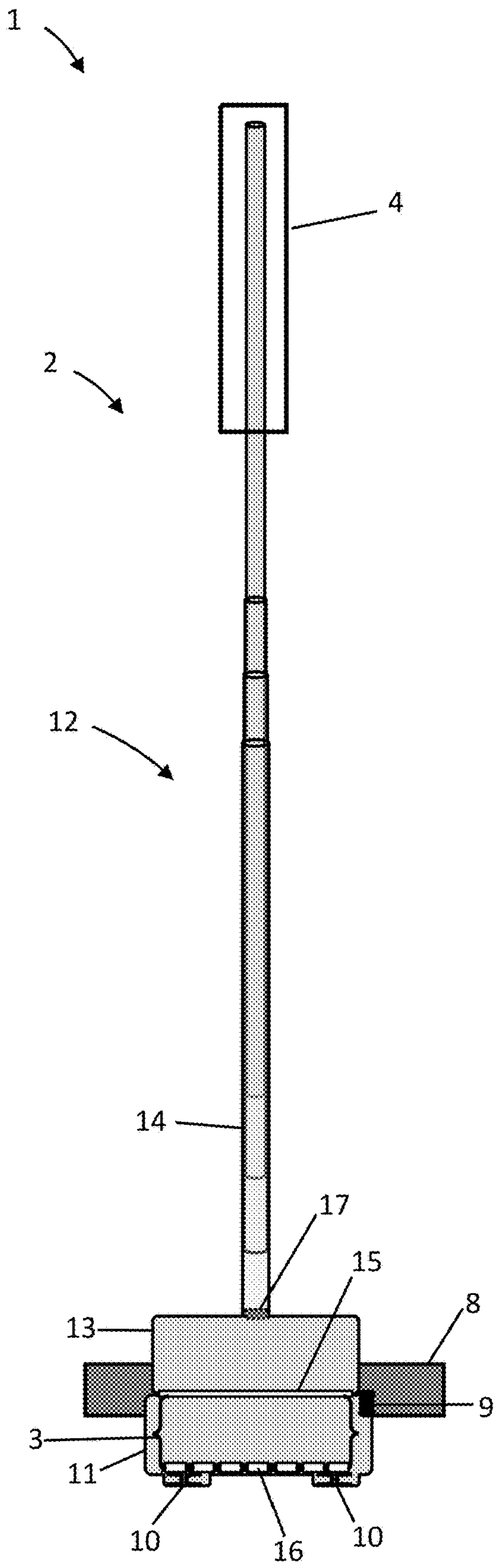
FIG. 8 is a SDSV of USHP showing original or initial settings: a vehicle with compressible walls with the vehicle base open at the bottom of the lower chamber, a recycle door closed, and the water tower filled with water. The upper reservoir is shown empty to show how it gets filled during subsequent steps of operations. The upper reservoir water level is not part of the initial settings.

FIG. 8 shows the initial settings for USHP 1 with the water tower 2 filled with water.

With the recycle door 9 closed, vehicle 3 is at the bottom of the lower chamber 11 with the vehicle base 16 open. Upper reservoir 4 is shown empty to clearly show water movement during subsequent steps of operations.

Figure 9:
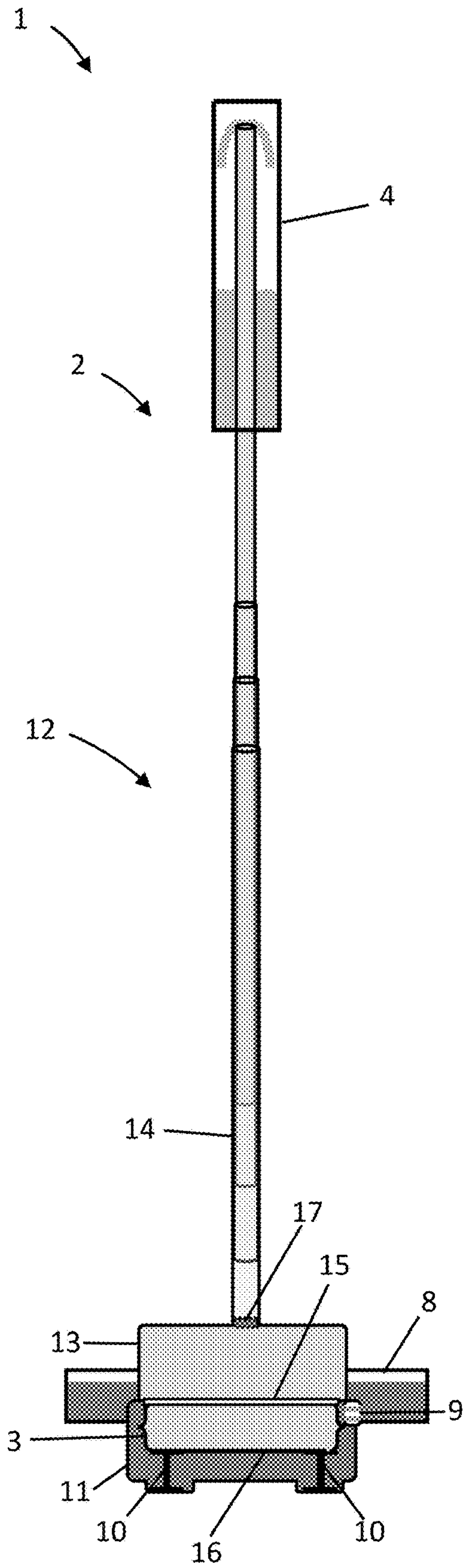
FIG. 9 is a SDSV of USHP showing the vehicle with compressible walls being lifted using a VLD. The vehicle base is closed, and the recycle door is open to fill the void with water from the lower reservoir. The void is produced by the vehicle volume getting smaller in the lower chamber. The water level in the lower reservoir drops as the upper reservoir is filled.

FIG. 9 shows that the lower chamber 11 and the upper chamber 12 are separated with the vehicle base 16 closed. Before operating the VLD 10, open the recycle door 9 to allow the vehicle 3 to be lifted. Opening both the vehicle base 16 and the recycle door 9 will drain water from the upper chamber 12. Placing a one-way waterflow valve 17 between the body chamber 13 and the head chamber 14 should be included in the overall system design to prevent water release from the head chamber 14. Especially for large-capacity systems, additional units of one-way valve 17 are placed in the head chamber 14.

FIG. 9 shows the vehicle 3 operating like a plunger to pump water in the upper chamber 12 into the upper reservoir 4. As the vehicle 3 is lifted, its volume in the lower chamber 11 gets smaller, making a void for water to flow into the lower chamber 11 from the lower reservoir 8 through the recycle door 9.

Figure 10:
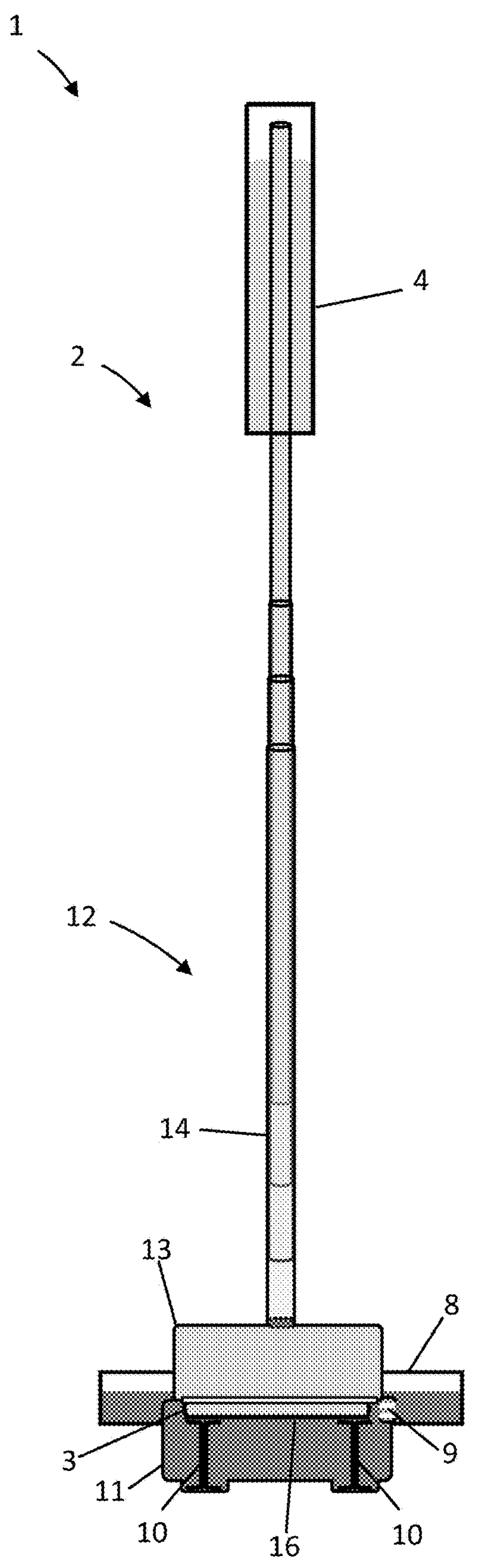
FIG. 10 is a SDSV of USHP with the vehicle lifted, and the void in the lower chamber is filled with water from the lower reservoir.
Figure 11:
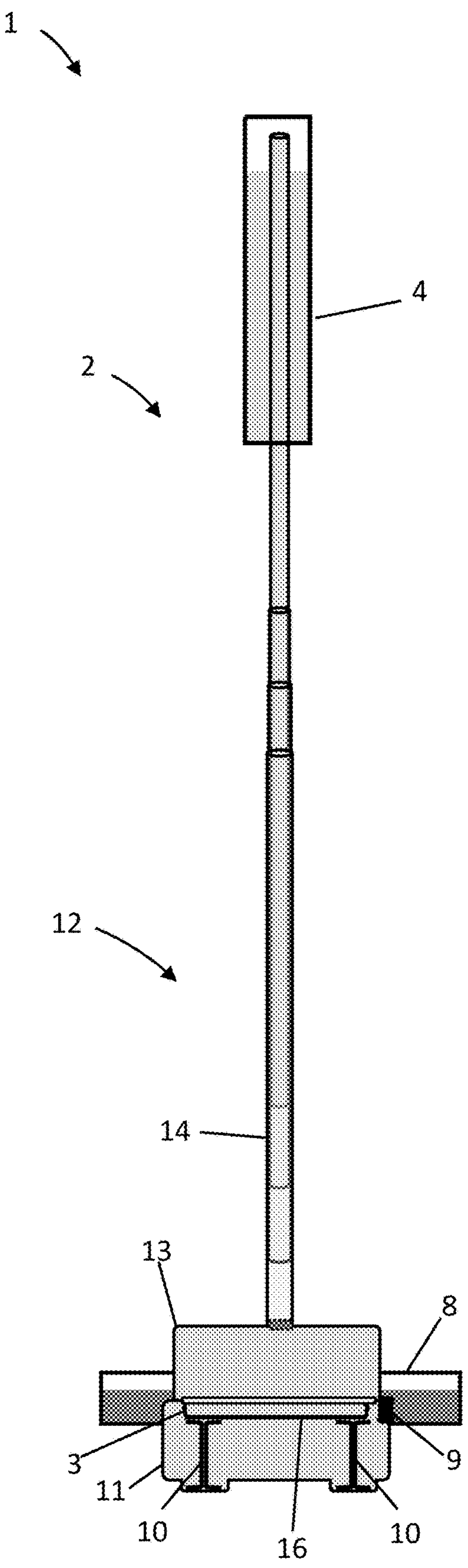
FIG. 11 is a SDSV of USHP with the recycle door closed. As the recycle door closes, the vehicle stops moving.

FIG. 10 shows the vehicle 3 lifted with the vehicle base 16 closed. FIG. 11 shows the water tower 2 is full of water and separated from the lower reservoir 8 with the recycle door 9 closed.

Figure 12A:
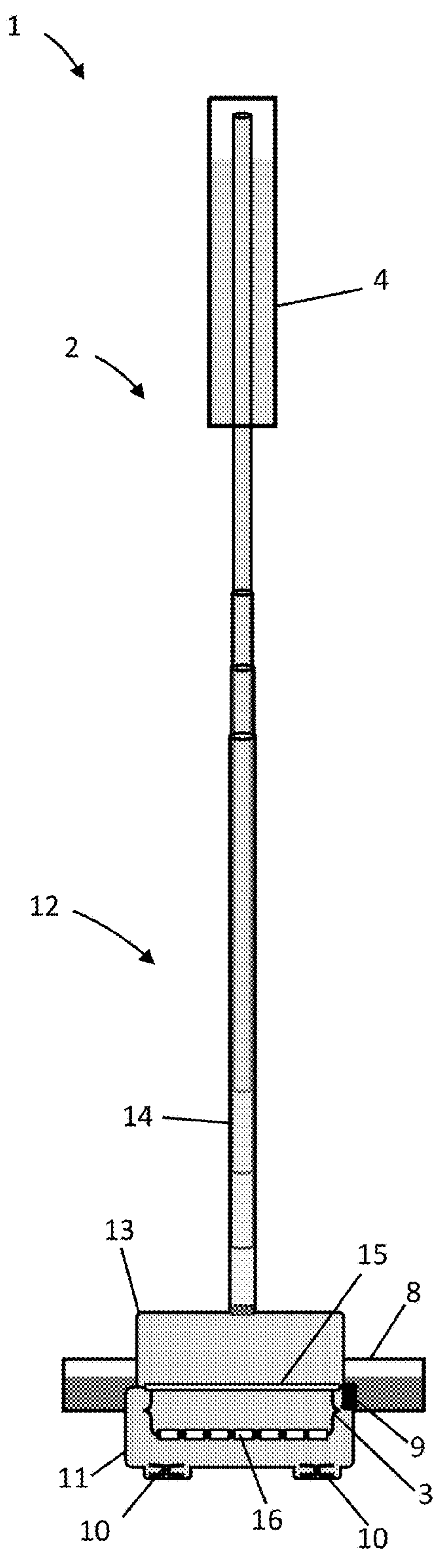
FIG. 12*a* is a SDSV of the water tower showing a VLD lowered and disengaged from the vehicle; with the vehicle base open, the vehicle walls start decompressing.

With the recycle door 9 closed, disengage and lower the VLD 10, and open the vehicle base 16 to start decompressing the walls of vehicle 3 as shown in FIG. 12*a*. The vehicle base 16, which is denser than the walls of the vehicle 3, sinks and stretches the compressed walls of the vehicle 3. Alternatively, the VLD 10 can be used to help pull down the vehicle base 16 to restore the shape of vehicle 3 faster. Once vehicle 3 is at the bottom of the lower chamber 11 (FIG. 12*b*), having returned to the initial conditions, operations may be repeated.

Water levels in the upper reservoir 4 and the lower reservoir 8 change as vehicle 3 is lifted. The upper reservoir 4 and the lower reservoir 8 are separate from the water tower 2. Water tower 2 is kept full of water throughout USHP operations since the void in the lower chamber 11 gets filled in real-time through the recycle door 9. The importance of this is discussed in the Energy Calculations section below.

To generate electricity and replenish the lower reservoir 8, USHP 1 releases water from the upper reservoir 4 through a reservoir release valve 5. The lower reservoir 8 receives hydro-discharge at the lower reservoir entrance 18 (FIG. 1).

The upper chamber 12 has a unique combination of a body chamber 13 and a head chamber 14. The shape and volume of body chamber 13 are large enough to accommodate the movement of vehicle 3. More specifically, the body chamber 13 volume generally matches the maximum volume change in vehicle 3 in the lower chamber 11.

Figure 13A:
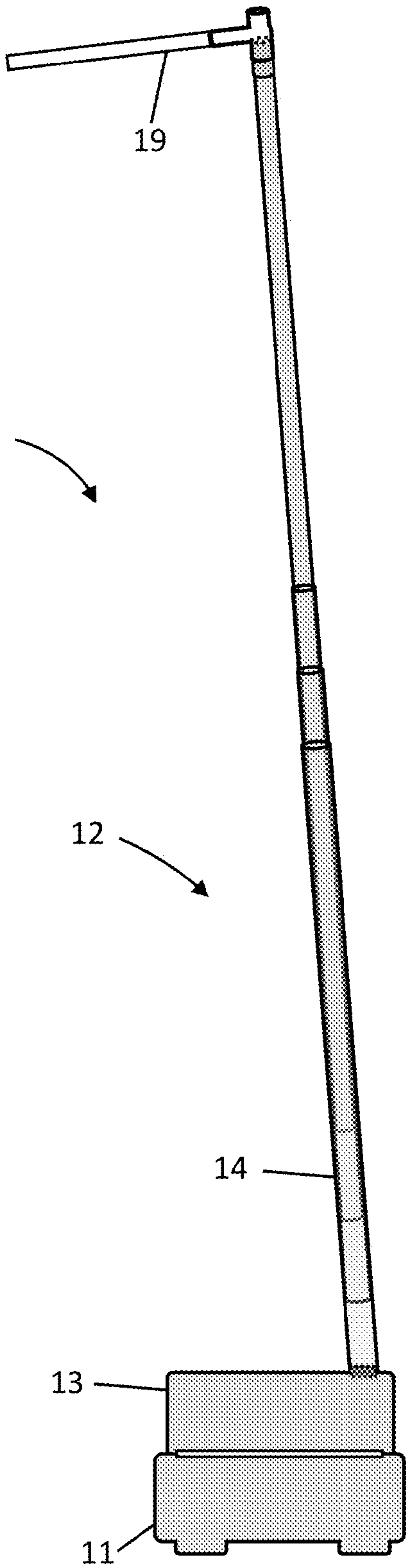
FIG. 13*a* is a SDSV of USHP with a head chamber at an angle and off center.
Figure 13B:
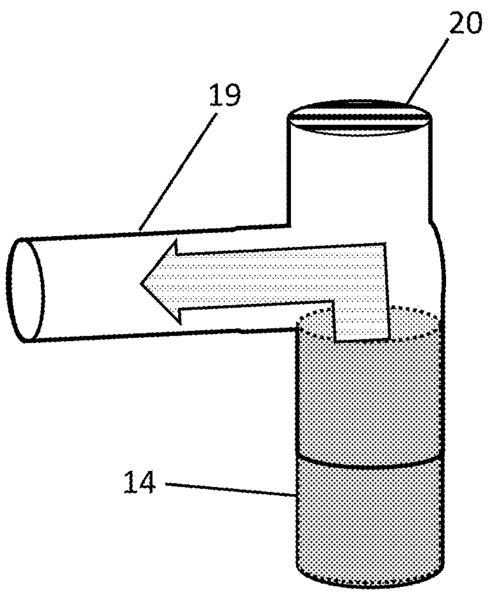
FIG. 13*b* is a SDSV-3D of a portion of a connecting pipe at the top of the head chamber; water flow direction is represented by an arrow.

For some PSH (pumped-storage hydropower) applications, it is useful to have the head chamber 14 at an angle to connect to the upper reservoir 4. FIG. 13*a* shows the head chamber 14 supply water through a connecting pipe 19 to the upper reservoir 4 (not shown). FIG. 13*b* shows the top portion of FIG. 13*a* focusing on the connecting pipe 19 with a top vent 20 that is open and tall enough to prevent pumped water from escaping and to allow free waterflow to the connecting pipe 19 from the head chamber 14.

USHP design provides flexibility to adapt to different applications and the environment. For example, as shown in FIG. 1, the head chamber 14 is a telescopic pipe that is retracted or extended for maintenance or for other reasons, including enhanced capacity operations. A penstock 6 shown in FIG. 1 is telescopic as well.

Figure 14:
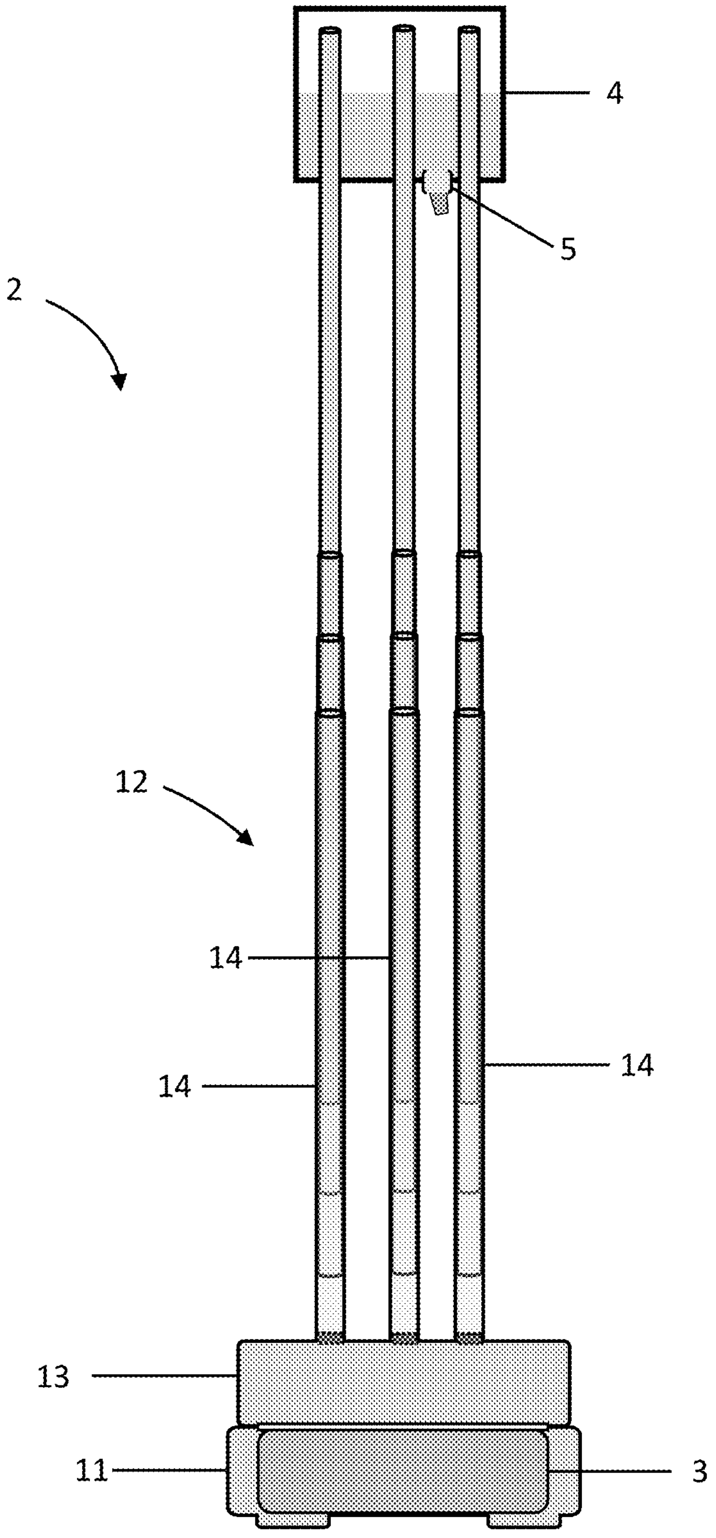
FIG. 14 is a SDSV of a water tower with a common upper reservoir for three head chambers.

FIG. 14 shows a variation of USHP 1 with a common upper reservoir 4 for multiple units of the head chamber 14.

Figure 15:
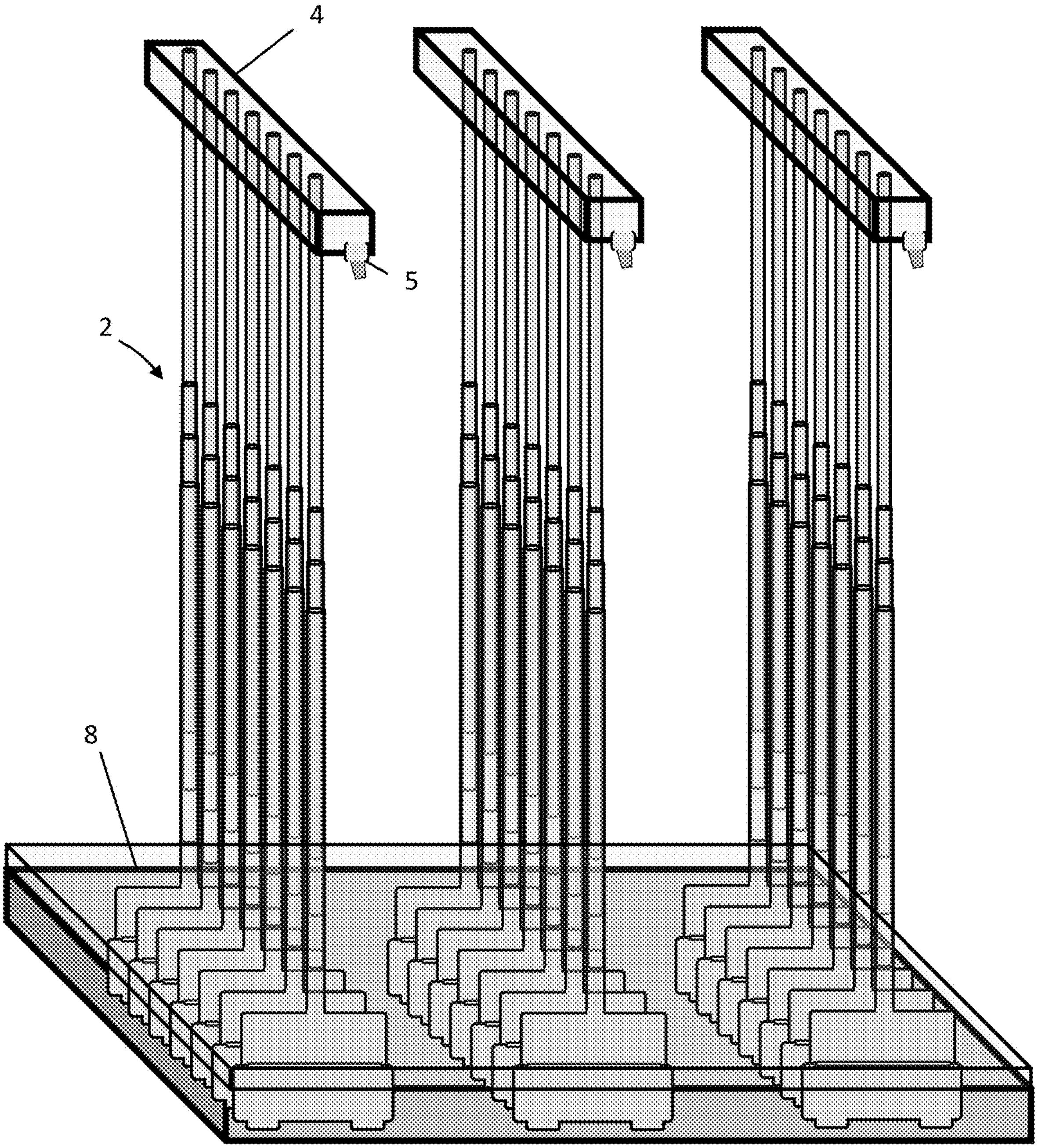
FIG. 15 is a SDSV-3D of a small USHP farm with three rows of USHP systems. Individual components are not labeled, and some parts are not shown, such as penstocks and turbine generators, to focus on the scale and scalability of the USHP farm. The USHP farm is shown sharing a common lower reservoir, and each row has a common upper reservoir.

FIG. 15 shows a perspective of a USHP farm of 21 USHP 1 systems (arbitrarily chosen) that fits into ~0.5 acres of land, with each row of USHP 1 systems sharing a common upper reservoir 4. Shown is one release valve 5 for each common upper reservoir 4. The USHP farm shares a common lower reservoir 8 with a separate recycle door 9 for each USHP 1 system. FIG. 15 intentionally does not show many details at the component level to provide a high-level perspective of the USHP farm. For a qualitative comparison, a single 2-MW WTG comparable to a USHP 1 would need ~1.5 acres of land. Solar panels require ~10 acres of land for a 2-MW capacity.

For a small capacity of ~100 kilowatts, smaller or mini USHP systems can be built at a factory with minimal assembly at the job site. Transport these mini USHP systems where needed, add water, and operate. Since the USHP design allows multiple units to operate next to each other in a manner shown in FIG. 15, it is easy to scale up and build a USHP farm in a matter of days.

VLD 10 is a hydraulic lift motor or a motor operating a linear gear to control the vertical movements of the vehicle 3. Lifting a large, heavy water-moving vehicle 3 repeatedly for an extended period requires careful assessments as to how and where to stage and operate one or more VLD 10 units. Planning for maintenance, repair, and replacement should also be considered.

VLD 10 operates at different locations depending on the design, such as alongside rather than from the bottom of vehicle 3. The VLD 10 is also operable from the top of the body chamber 13 by pulling up the vehicle 3. A useful feature of the VLD 10 is the ability to lock vehicle 3 in any position within its allowed range. There is no need for separate brakes to stop and hold the vehicle 3.

A plurality of USHP 1 shares a common upper reservoir 4, which minimizes the overall upper reservoir size while improving the combined system's structural integrity. The upper reservoir 4 takes different shapes and volumes depending on the operational requirements. For SPP (standalone power production) applications, USHP 1 has the upper reservoir 4 placed around or near the top of the head chamber 14 (FIG. 1).

USHP 1 Operations

USHP 1 uses redundant sensors for monitoring water flow rate, water volume, and water level, as well as operating all components. The water level in the lower reservoir 8 is kept higher than the top of the lower chamber 11 via hydro discharge from a turbine generator 7 or external water supply as necessary throughout operations.

Before starting an operation, the following initial settings of USHP 1 need to be met, as shown in FIG. 8:

a) a recycle door 9 is closed;
b) a vehicle base 16 is open;
c) water tower 2 is filled with water to the top of head chamber 14; as necessary, open one-way gate valve 17;
d) vehicle 3 is at the bottom of the lower chamber 11. FIG. 8 shows a darker gray for water in the lower reservoir 8 compared to water in the water tower 2 to clearly show the water tower 2 is separate from the lower reservoir 8 and they are not in fluid communication at this stage with the recycle door 9 closed.

Once these USHP 1 initial settings, as shown in FIG. 8, are verified using multiple redundant sensors, start the operation by performing and ensuring the following sequential tasks, i.e., after each task is completed and verified, the next task is performed:

1) Close the vehicle base 16 to separate water between the lower chamber 11 and the upper chamber 12. Water inside vehicle 3 is now part of the upper chamber 12.
2) Open the recycle door 9 to establish fluid communication between the lower chamber 11 and the lower reservoir 8, as shown in FIG. 9. Both the lower reservoir 8 and the lower chamber 11 are shown in the same darker gray to show that they are in fluid communication.
3) Use VLD 10 to lift vehicle 3 as shown in FIGS. 9 and 10. Since the water tower 2 is already filled with water to the top of the head chamber 14, lifting the vehicle 3 moves water in the upper chamber 12 out of the water tower 2 and into the upper reservoir 4, as shown in FIG. 9. Water from the lower reservoir 8 fills the void in the lower chamber 11 through the recycle door 9.
4) When vehicle 3 is lifted (FIG. 10) to a desired height, close recycle door 9 (FIG. 11).
5) Open the vehicle base 16 (FIG. 12*a*), and the entire water tower 2 is in fluid communication. The water volume is conserved in water tower 2 throughout the operations. As the water is pumped into the upper reservoir 4, leaving the water tower 2, the void in the lower chamber 11 gets filled with water from the lower reservoir 8, entering the water tower 2. The same total water volume in water tower 2 is maintained throughout the operations.

Figure 12B:
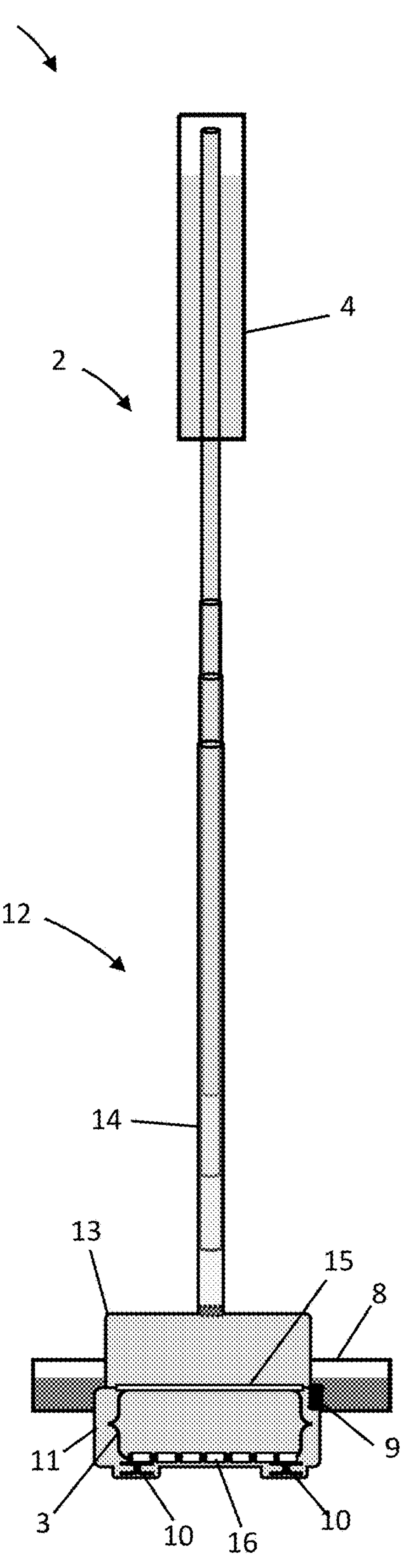
FIG. 12*b* shows the water tower has returned to the initial settings with the vehicle down at the bottom of the lower chamber with the vehicle base open.

6) Disengage the vehicle 3 from the VLD 10 (FIG. 12*a*), with the vehicle base 16 open, to decompress the walls of the vehicle 3. When vehicle 3 reaches the bottom of the lower chamber 11, the initial settings are restored (FIG. 12*b*).

7) Verify the initial conditions a)-d) in the USHP 1 operations are restored before repeating the operations following steps 1)-6).

It should be noted that lifting vehicle 3 requires VLD 10 to also lift water above vehicle 3 in the upper chamber 12. The water column volume above vehicle 3 is not uniform since the head chamber 14 cross sections are smaller than the body chamber 13. This is a very important feature of the USHP 1. Additional discussions of USHP 1 are provided below.

Energy Calculations

Assume a simple shape for a water-moving vehicle 3 with compressible walls and a bottom vehicle base 16. With the vehicle base 16 closed, vehicle 3 separates water in the lower chamber 11 and the upper chamber 12, with no fluid communication between the two chambers. With the vehicle base 16 open, the entire water tower 2 is now one body of water since the lower chamber 11 and the upper chamber 12 are in fluid communication. In the examples examined below, the vehicle 3 volume and mass are calculated with the vehicle base 16 closed with water in the vehicle 3.

Consider three cases with vehicle 3 having the same volume of 30-$m^3$ for USHP 1 to generate electricity comparable to a 2-MW WTG. Different heights for vehicle 3 and head chamber 14 are selected to highlight the importance of head chamber 14 to USHP 1. The height of the head chamber 14 is randomly picked to produce a head of either 50 m or 100 m. Head is assumed to be the vertical distance between the top of the head chamber 14 and the hydro input elevation to the turbine generator 7, which is assumed to be about 1 m above the lower chamber 11.

In rough-order calculations, it is assumed that vehicle 3 could be compressed 100%. In all three cases, each time a vehicle 3 is lifted, 30 $m^3$ of water is pumped into an upper reservoir 4. The total mass VLD 10 has to lift is the sum of the mass of the vehicle 3 and the water column above the vehicle 3.

In simple terms, lifting vehicle 3 pushes water out of upper chamber 12 and into upper reservoir 4. Before starting an operation, fill the water tower 2 to the top of the head chamber 14. Throughout operations, the following is observed:

Volume of water pumped into an upper reservoir 4
=Vehicle 3 volume change in the lower chamber 11
=Void volume in the lower chamber 11
=Volume of water entering the lower chamber 11 from the lower reservoir 8 a) Vehicle 3 height (h) and radius (r): h=5-m, r=~1.38-m.
Vehicle 3:
volume: π×(r)$^2$×5-m=30-$m^3$
water loaded mass: 31 MT
movement range: 0 to 5-m [the height of vehicle 3]
Low chamber 11: h=5-m
Body chamber 13: h=5-m
water volume above vehicle 3: 30-$m^3$=30 MT
Head chamber 14: h=46-m, r=0.3-m
water volume: 13-$m^3$=13 MT
Total-mass to be lifted
=vehicle 3+water above vehicle 3
=(31+30+13) MT=74 MT
Energy to lift total-mass by 5-m:
ET=74000-kg×9.8 m/$s^2$×5-m
Head (from 1-m above lower chamber 11):
50-m=(5-m−1-m)+46-m [height of upper chamber 12 minus 1 m]
Ideal maximum capacity: 30-$m^3$ of water at 50-m
13 MJ~ (30000-kg×9.8 m/$s^2$×50-m)−ET b) Vehicle 3: h=2-m, r=−2.19-m
Vehicle 3:
volume: 30-$m^3$
water loaded mass: 31 MT
movement range: 0 to 2-m
Low chamber 11: h=2-m [vehicle 3 height]
Body chamber 13: h=2-m
water volume above vehicle 3: 30-$m^3$=30 MT
Head chamber 14: h=49-m, r=0.3-m
[3-m longer than the 5-m case for the same head]
water volume: ~14-$m^3$=14 MT
Total-mass to be lifted
=vehicle 3+water above vehicle 3
=(31+30+14) MT=75 MT
Energy to lift total-mass by 2-m:

$$ET=75000\text{-kg}\times 9.8\ \text{m/s}^2\times 2\text{-m}$$

Head (from 1-m above lower chamber 11):

$$50\text{-m}=(2\text{-m}-1\text{-m})+49\text{-m}$$

Ideal maximum capacity: 30-$m^3$ of water at 50-m $$13\ \text{MJ}\approx(30000\text{-kg}\times 9.8\ \text{m/s}^2\times 50\text{-m})-ET$$

c) Vehicle 3: h=2-m, r=−2.19-m.
Vehicle 3: [same as in b)]
volume: 30-$m^3$
water loaded mass: 31 MT
movement range: 0 to 2-m
Low chamber 11: h=2-m [same as in b)]
Body chamber 13: h=2-m [same as in b)]
water volume: 30 MT [same as in b)]
Head chamber 14: h=99-m, r=0.3-m
water volume above vehicle 3: 28-$m^3$=28 MT
[~twice the height and mass of b)]
Total-mass to be lifted
=vehicle 3+water above vehicle 3
=(31+30+28) MT=89 MT
Energy to lift total-mass by 2-m:
ET=89000-kg×9.8 m/$s^2$×2-m
Head (from 1-m above lower chamber 11):
100-m=(2-m−1-m)+99-m
Ideal maximum capacity: 30-$m^3$ of water at 100-m
27.7 MJ≈(30000-kg×9.8 m/$s^2$×100-m)−ET It may not be obvious as to how USHP 1 could convert the mechanical energy of lifting the vehicle 3 to produce substantially more in the form of hydropotential energy. The answer is in how the USHP 1 is prepared and operated.

It may be useful to compare the USHP 1 and a hot air balloon. A hot air balloon initially requires filling a deflated balloon with hot air, like filling an empty water tower 2. This initial preparation requires a lot of energy and, proportionally, more as the system capacity increases. As a bigger balloon could carry more mass, the bigger the water tower 2, the more energy could be generated.

Starting the USHP 1 with the water tower 2 filled with water is equivalent to preparing the hot air balloon filled with hot air in an upright position on the ground. At this point, applying relatively little additional energy, compared to preparing the systems initially, will set them in motion. The major difference between a hot air balloon and an USHP 1 is that the hot air balloon loses hot air much more rapidly than the USHP 1 loses water through evaporation, whether the system is idle or in motion.

Maintaining the water tower 2 filled with water to the top of the head chamber 14 would be like keeping the hot air balloon ready for takeoff in an upright position on the ground. The USHP 1 effectively and efficiently conserves the initial energy of filling the water tower 2. As USHP 1 pumps water into the upper reservoir 4, the void in the lower chamber 11 gets filled with water simultaneously through the recycle door 9. Total water volume in water tower 2 is kept constant throughout operations.

The inner cross section of the head chamber 14 needs to be smaller than that of the body chamber 13; otherwise, the USHP 1 would not realize desired efficiencies. Flowrate into the upper reservoir 4 is a critical parameter affecting the USHP 1 capacity. The USHP 1 is a large hydromechanical system that would complete a few cycles of operation per minute. Optimizing the flowrate as a function of the diameter of the head section 14 relative to the upper reservoir 4 is important.

The USHP 1 uses the negative buoyancy of the vehicle 3 to restore it to its initial position for repeat operations. The vehicle base 16, which is denser than the walls of the vehicle 3, should be in an open position to restore the vehicle 3 to its initial settings. Just to complete the comparisons, a hot air balloon releases hot air from the balloon to lower itself. While the released hot air is no longer usable by the hot air balloon, the recycled water continues to fuel the USHP 1.

In all three cases considered above, the same void volume (30 $m^3$) is produced in the lower chamber 11 during each cycle, and the same water volume (30 $m^3$) is added to the upper reservoir 4 at different heights and then released for energy calculations.

The work required to lift vehicle 3 from the bottom of the lower chamber 11 in the first two cases roughly has the same total mass of ~75 MT. The 5-m tall vehicle 3 is lifted 5 m, whereas the 2-m tall vehicle 3 is lifted 2 m to produce the same void volume of 30-$m^3$ in the lower chamber 11 since the lower chamber 11 height is designed to match the height of the vehicle 3. Overall dimensions, especially the height of vehicle 3, are key parameters to optimize in the USHP design.

Although this is a simplistic view of a complex system, it clearly demonstrates that the shape and volume of vehicle 3 affect the design of the water tower 2.

Compared to the second case, the third case increased the head by ~100% but added only ~19% to the total mass (from 75 MT to 89 MT) to be lifted. The shape and volume of vehicle 3 remain the same for both the second and third cases. Making the head chamber 14 taller would not require changes to the rest of the water tower 2, including the vehicle 3.

The USHP 1 can increase the system capacity, within reason, by extending the height of the head chamber 14. This clearly differentiates the USHP from VMSW design and operations.

In the third case, the VLD 10 is assumed to operate at a reasonable 0.1 m/sec, taking ~20 seconds to lift the vehicle 3 and the water above. In all of these calculations, an inner diameter of 0.6 m is used for the head chamber 14, which is a relatively large pipe diameter capable of delivering water at ~1.5 $m^3$/sec. It would take less than 10 seconds to fully restore the USHP 1 to its initial settings: close the recycle door 9 and then open the vehicle base 16 to reposition the vehicle 3 to the bottom of the lower chamber 11. It is important to balance the VLD 10 lifting speed against the power needed to operate the VLD 10.

For these approximate or rough order calculations, once the VLD 10 starts lifting the vehicle 3, we have ignored that there is less and less water to be lifted in the upper chamber 12. For the third case, the average total mass lifted is ~74 $m^3$: initially ~89 $m^3$ and ends with ~59 $m^3$ as 30 $m^3$ of water above vehicle 3 has been pumped into the upper reservoir 4. Also, for simplicity, it is assumed that vehicle 3 could be compressed 100% when it is more likely that compressibility would be 80% to 90%.

The potential energy available from 30 $m^3$ of water at 100 m, after subtracting the energy used to lift the total mass, is ~27.7 MJ. For power production, at ~70% overall efficiency, the USHP 1 used in this example generates ~19.4 MJ every 30 seconds, generating ~650 kW, comparable to the power output from a 2-MW WTG. Although energy calculations are done with a 30-$m^3$ vehicle 3, the larger the vehicle 3 and the taller the head chamber 14, the more hydropotential energy could be harvested.

This is a crude estimation, looking primarily at the positive aspects of having a taller head chamber 14. There are engineering difficulties and other considerations associated with having a taller head chamber 14, such as larger support structures for the head chamber 14, that will affect the overall performance.

Lifting 100 MT or more repeatedly is a difficult task. Several smaller units of vehicle 3 can be used in the water tower 2, or the vehicle 3 itself is segmented into multiple parts and lifted separately.

The time to lift vehicle 3 depends on several factors, including the total mass VLD 10 must lift and the smallest opening cross section in the upper chamber 12. In the examples considered above, the smallest opening through which the VLD 10 pumps water is the head chamber 14 with a 0.6-m inner diameter. The head chamber 14 diameter needs to be optimized against the total mass, as increasing the diameter will increase the head chamber 14 water volume.

In addition to using power to operate VLD 10, operating the rest of the USHP 1 apparatus, such as a vehicle base 16, a recycle door 9, etc., would benefit from having access to the grid, similar to WTGs, for example. USHP needs to have a standalone UPS (uninterruptible power supply) battery backup. As a figure of merit, the power needed to operate a vehicle base 16 or a recycle door 9 would be comparable to operating a garage door, for example, with ~1 HP motor. The vehicle base 16 should close and open quickly.

USHP vs. VMSW

USHP claims significant changes and differences compared to VMSW. It may be useful, even if casually, to compare these two systems. By using the same head, it is possible to compare these two systems pumping the same volume of water to their respective upper reservoirs at about the same time.

Two systems differ in how they pump water into their respective upper reservoirs. USHP uses a water-moving vehicle that is completely contained in its lower chamber, whereas VMSW relies on a positively buoyant driver that spans the entire length of its water tower. In more simple terms, assuming 100-m tall water towers for both, the USHP vehicle 3 is ~2% of the height of the water tower 2, whereas the VMSW driver is at least as tall as the VMSW water tower.

USHP lifts a vehicle 3 to pump water in the upper chamber 12 into the upper reservoir 4. For USHP, the volume of vehicle 3 is the upper limit of the pumped water. Vehicle 3 is negatively buoyant and sinks to the bottom of the lower chamber 11 to restore its shape and form when disengaged and not supported by VLD 10. Vehicle 3 has a relatively short height of less than 2 m, as discussed in the examples above. The height of vehicle 3 is the upper limit for the vehicle 3 that could be lifted.

VMSW moves a driver by changing the water level in the water tower. First, VMSW reduces the wide-section volume by using piston cylinders to force the water level to rise. Then the driver is released to move up to maintain its neutrally buoyant point. The wide-section transfers water to the upper reservoir, which lowers the water level, and then the piston cylinders pull back to lower the water level even more. When released, the driver moves down and restores VMSW for repeat operations.

The USHP upper chamber 12 has two parts: a body chamber 13 and a narrow head chamber 14. The shape and volume of the body chamber 13, just above the vehicle 3, are roughly the same as those of the vehicle 3. The body chamber 13 provides water for vehicle 3 to pump into the upper reservoir 4. The cross section of the head chamber 14 is an order of magnitude smaller than that of the body chamber 13, and the head chamber 14 dimensions are not constrained by the vehicle 3.

The VMSW upper chamber has three parts, and the driver is present in all of them: a narrow-section at the top, followed by a wide-section and a long-section. For the same head, VMSW must be taller than the USHP water tower since the narrow-section of the upper chamber does not contribute to the head as the upper reservoir is at the wide-section level. VMSW needs a ~1,000 MT driver for a 2-MW capacity system. The USHP uses ~30 MT vehicle 3 to generate the same output.

USHP prefers to use a relatively short and large-diameter vehicle 3, to minimize the amount of work needed to pump water into the upper reservoir 4. For VMSW, increasing the driver diameter makes the entire water tower uniformly larger since the driver must float following the water level in the water tower.

USHP simultaneously produces and fills a void in the lower chamber 11 while supplying water to an upper reservoir 4, unlike VMSW, which requires multiple steps to change the water level in the water tower to move its driver to produce the void. Every additional step taken results in a longer cycle time and reduces the system capacity.

According to U.S. Ser. No. 11/415,097B1, the VMSW driver, with a radius of 1.7 m and a cross section of 9 $m^2$, is raised ~3.3 m to produce a void volume of 30-$m^3$ in the VMSW lower chamber, which is the same water volume transferred to its upper reservoir in the wide-section. Said differently, the VMSW water tower can't have a cross section less than 9 $m^2$ anywhere in this example. As discussed in the energy calculations above, the USHP head chamber 14 cross section, which is independent of the vehicle 3 dimensions, is only ~0.3 $m^2$, $\frac{1}{30}^{th}$ of the diameter of the VMSW long-section, to pump 30-$m^3$ of water into the upper reservoir 4. Making the vehicle 3 larger does not affect the dimensions of head section 14. USHP could triple the cross section of the head chamber 14 and still be smaller by an order of magnitude compared to that of the VMSW long-section.

These are qualitative comparisons, but for the USHP, the vehicle 3 with compressible walls stays and operates in the lower chamber 11 and does not move into the upper chamber 12, whereas the VMSW driver spans the entire water tower.

Water Tower 2

For a MW capacity USHP, the water tower 2 could be 100 m or taller, comparable to a WTG height. Unlike WTGs, however, USHP could be built and operated next to each other (FIG. 15) or next to tall buildings, alongside bridges, or even at a hillside. USHP can leverage existing power transmission infrastructure or substantially minimize infrastructure needs since they can be built at or near the location of power consumption.

A plurality of vehicles 3 can operate in a water tower 2, with one or more units of head chamber 14. For each vehicle 3, USHP 1 uses a separate lower chamber 11 and a recycle door 9. This is a variation of having a segmented vehicle 3 that provides adjustable pumping capacity.

The head chamber 14 is essentially a very long telescopic pipe that could be extended and retracted. There are many variations, including the head chamber 14 built by stacking or connecting multiple sections of pipes, with each section equipped with a one-way gate valve 17.

A plurality of USHP systems is combined to form a USHP farm, in which each USHP system operates independently to pump water into an upper reservoir 4 for immediate or later use.

For SPP applications, a plurality of USHP systems share a common upper reservoir 4 and a common lower reservoir 8 (FIG. 15), with a separate recycle door 9 for each USHP system.

There are many ways to construct a USHP system. For example, use panels that interlock to construct the structure of the water tower 2 with strategically placed connecting and support rods. By using liners to make the entire USHP 1 watertight, the panels provide rigid structure for the liners. It is envisioned that much of the water tower 2 parts are prefabricated and assembled at the job site. Due to the symmetrical shapes of the panels, they are stacked for transportation and storage. Almost all the materials should be reusable and recyclable.

For SPP applications, building and operating a USHP 1 in an extreme cold environment requires, for example, additional insulation, the use of heating coils, the use of salt water to lower the water freezing temperature, and circulating water continuously. Especially in challenging environments, USHP 1 should be protected.

CONCLUSION

The preferred embodiments of the present invention provide innovative ways to recycle and supply a large volume of water from a lower reservoir to an upper reservoir for various applications, including generating electricity. USHP substantially reduces the VMSW water tower dimensions, introducing various vehicle designs to push or pump water in the upper chamber into an upper reservoir.

The USHP water tower has a unique combination of a lower chamber, designed for a vehicle to operate inside, and a slim upper chamber. The upper chamber further comprises a body chamber, just above the lower chamber, to provide water for the vehicle to be pumped, and a tall and slender head chamber.

The vehicle can take many different forms and shapes. For general discussion and illustration purposes, USHP uses a vehicle with compressible walls and a bottom vehicle base.

With its vehicle base closed, the vehicle separates the lower chamber and upper chamber, with no fluid communication between the two chambers.

As the vehicle is lifted, producing a void in the lower chamber, water from a lower reservoir fills the void in real-time through a recycle door. Closing the recycle door and then opening the vehicle base combine all the water in the water tower, which now includes the water that filled the void. For power production applications, there is no difference between the recycled water added to the lower chamber and the water that was in the water tower already.

The vehicle is denser than water. With the vehicle base open, the vehicle will restore its own form and shape and reposition itself at the bottom of the lower chamber.

For both PSH (pumped-storage hydropower) and SPP (standalone power production) applications, released water from the upper reservoir through a penstock turns a turbine generator, located at ground level, to generate electricity. Hydro discharge, or exiting water from a turbine generator, is collected in the lower reservoir for reuse.

USHP is scalable. For hydropower systems, the head is proportional to the height of the upper chamber. Also, the larger the void, the more water is pumped into the upper reservoir. The void in the lower chamber is determined by the vehicle's movement or change in the vehicle's volume in the lower chamber.

Since each USHP system operates independently, the USHP farm, with a plurality of USHP systems, operates continuously while allowing for rolling maintenance, repairs, and upgrades at the individual USHP system level. The USHP farm allows the use of a common lower reservoir and a common upper reservoir for more compact formations requiring less land to build.

Although the invention has been explained in relation to its preferred embodiments, it is to be understood that many other possible modifications and variations can be made without departing from the spirit and scope of the invention.

The invention claimed is:

1. A utility scale hydro pump (USHP), a hydromechanical system for generating hydropotential energy and electricity, comprising:

- a water tower, filled with fluid, wherein the fluid is water, further comprising:
  - a lower chamber;
  - an upper chamber; said upper chamber further comprises:
    - a body chamber just above said lower chamber;
    - a head chamber above said body chamber; said head chamber has a smaller inner cross section than that of said body chamber; said body chamber and said head chamber are connected and share water or fluid communication;
    - a plurality of one-way waterflow valves in said head chamber to prevent water release from said head chamber; the water moves upward in the upper chamber;
  - a chamber opening shared between the top of said lower chamber and the bottom of said upper chamber;
  - a vehicle, a mechanism for moving water in said water tower; said vehicle operates in the lower chamber to push or pump water out of the top of the upper chamber; said vehicle comprising;
    - walls; said walls maintain the shape of the cross section of said vehicle throughout operations;
    - a vehicle base; said vehicle base is used to combine or separate water between the lower chamber and upper chamber; the lower chamber and the upper chamber are separated when the vehicle base is closed and the two chambers are not in fluid communication;
- an upper reservoir, for standalone power production applications, placed near or surrounding the top of the upper chamber to take in, hold, and release pumped water; the top of the said upper reservoir is protected from weather elements but open or has a vent; the placement of said upper reservoir is designed to maximize the head; said upper reservoir further comprises:
  - a connecting pipe between said upper reservoir and the top of said upper chamber; said connecting pipe has a top vent;
  - a reservoir release valve to control water release from said upper reservoir;
- a lower reservoir, a repository of water near said lower chamber, with the water level of said lower reservoir maintained above the top of the lower chamber, to collect, store, and supply water to said lower chamber; said lower reservoir further comprises:
  - a sliding, watertight recycle door connecting to said lower chamber; when said recycle door is open, said lower chamber and said lower reservoir are in fluid communication;
  - a hydro-discharge entrance to receive exiting water or hydro-discharge from a turbine generator;
- a penstock connected to the said reservoir release valve and extended down to a hydro turbine generator; said hydro turbine generator discharges water to the hydro discharge entrance and into the lower reservoir;
- a vehicle lifting device (VLD), a mechanism, such as a hydraulic lift motor, to lift or compress said vehicle; said VLD controls the movement of the vehicle.

2. The USHP of claim 1, wherein the vehicle further comprises

- a cylindrical or polygon-shaped vehicle with top and bottom vehicle bases; stretchable watertight bellows secured between the top of the vehicle and said chamber opening to cover any gap while said vehicle is lifted from the lower chamber; said vehicle is operated with the bottom vehicle base only; when the lower chamber and the upper chamber are separated by closing said vehicle base, the water above the vehicle and water inside the vehicle are part of said upper chamber regardless of where said vehicle is positioned;
- said vehicle is made up of multiple parts, each part is lifted independently;
- said walls of the vehicle are compressible and have a bottom base; said vehicle further comprises:
  - the top edge of said vehicle is secured and sealed around said chamber opening; when said vehicle base is closed, water in the lower chamber and the upper chamber are separated, and the two chambers are no longer in fluid communication;
  - said vehicle starts recovering its original form and shape after the recycle door is closed by opening the vehicle base and disengaging VLD from said vehicle, denser than water, to use gravity to lower the vehicle to the bottom of the lower chamber; in addition, said vehicle has power components to help quickly restore its form and shape to its original condition; furthermore, without disengaging from said vehicle, said VLD is used to help pull down the vehicle to help quickly restore its form and shape to its original condition;

said vehicle volume establishes an upper limit for the void volume in the lower chamber and also the maximum amount of water pumped into the upper reservoir;

the height of said vehicle determines the height of the lower chamber; increasing the height of the lower chamber unnecessarily reduces the head; the height of the vehicle establishes an upper limit for the vehicle's lifting distance;

the shape, volume, and movement of the vehicle define the shape and volume of the body chamber; making the volume of said body chamber larger than necessary lowers the system capacity since VLD has to lift more water while delivering the same amount of water to the upper reservoir;

the walls of said vehicle have multiple layers for a prolonged operation of continuous compression and decompression; the cross-sectional shape of the vehicle remains the same throughout operations;

wherein a plurality of said vehicles operate in the water tower, each vehicle having said recycle door and a recycle chamber;

wherein said head chamber is extended or retracted; the penstock is extended or retracted to match the height of the said head chamber;

wherein the height of the head chamber is made taller to increase the system capacity of the USHP without requiring modifications to the rest of the water tower;

wherein the inner cross section of the head chamber is changeable anywhere in the head chamber;

wherein said USHP has covers on exposed parts to reduce water loss through evaporation; said water tower operations are not affected by weather.

3. The USHP of claim 1, further comprising:

a common lower reservoir supplying water to a plurality of USHP systems; the use of said common lower reservoir allows for more compact configurations, requiring even less land;

a common upper reservoir for a plurality of USHP systems; said common upper reservoir releases more water per unit time than an upper reservoir for a single USHP system and supports the use of a larger scale turbine generator.

4. A method of generating hydropotential energy and electricity using the apparatus of the USHP of claim 1; said method comprising steps of:

a) establish the initial conditions to which the USHP will return after completing each cycle of operations, and the initial conditions comprising:

a recycle door closed between a lower reservoir and a lower chamber;

a vehicle, with its vehicle base open, positioned at the bottom of said lower chamber; vehicle walls stretched or decompressed;

a water tower is filled with water to the top of a head chamber;

a VLD (Vehicle Lifting Device) is positioned in the lower chamber to push or lift said vehicle;

b) once the initial conditions of the USHP are verified using multiple redundant sensors, an operation is started by performing and ensuring the following sequential tasks, each sequential task is completed and verified, and the next sequential task is performed automatically, the sequential tasks comprising:

1) close said vehicle base, separating water between said lower chamber and said upper chamber, ensuring there is no fluid communication between these two chambers;

2) open the recycle door that connects the lower chamber and the lower reservoir; while said recycle door remains open, said vehicle base stays closed to prevent water drainage or leakage from the upper chamber; said lower reservoir continues to maintain its water level to ensure the water is supplied from said lower reservoir to said lower chamber; the total water volume in the water tower stays constant throughout the operations;

3) use said VLD to lift said vehicle with its vehicle base closed; since said water tower is already filled with water, lifting said vehicle moves water out of the upper chamber and into the upper reservoir through a connecting pipe at the top of the head chamber; water from the lower reservoir fills a void, produced by lifting said vehicle, in the lower chamber, through said recycle door;

4) with said vehicle compressed or in an elevated position, verify said lower chamber is filled with water from the lower reservoir; close said recycle door;

5) open said vehicle base; the water in the entire water tower is in fluid communication; the total water volume in the water tower remains the same;

6) release and disengage said vehicle from the VLD to restore said vehicle to the initial settings; said VLD is lowered or retracted to allow said vehicle, denser than water, to sink as vehicle walls decompress or stretch; said VLD can be used to pull said vehicle down quickly;

7) verify the initial conditions are restored, as described in step 8-a) before repeating the operations following steps 8-b-1) to 8-b-6);

8) independently from the previous steps from 8-b-1) to 8-b-6), validating using the multiple redundant sensors that there is sufficient water in said upper reservoir, releasing water continuously from said upper reservoir for energy conversion and power production, and collecting hydro discharge or exiting water from a turbine generator in the lower reservoir for continuous recycling.

* * * * *